US010654444B2

(12) United States Patent
Kataoka et al.

(10) Patent No.: US 10,654,444 B2
(45) Date of Patent: May 19, 2020

(54) SEATBELT BUCKLE DEVICE AND SEATBELT DEVICE

(71) Applicant: AUTOLIV DEVELOPMENT AB, Vargarda (SE)

(72) Inventors: Goshu Kataoka, Yokohama (JP); Pengfei Ni, Yokohama (JP); Susumu Nakashima, Yokohama (JP); Srikanth Shanthmallappa, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 16/323,023

(22) PCT Filed: Aug. 3, 2017

(86) PCT No.: PCT/JP2017/028311
§ 371 (c)(1),
(2) Date: Feb. 4, 2019

(87) PCT Pub. No.: WO2018/025969
PCT Pub. Date: Feb. 8, 2018

(65) Prior Publication Data
US 2019/0161056 A1 May 30, 2019

(30) Foreign Application Priority Data
Aug. 5, 2016 (JP) .................................. 2016-154638

(51) Int. Cl.
*B60R 22/48* (2006.01)
*B60R 22/18* (2006.01)
*H01H 1/44* (2006.01)

(52) U.S. Cl.
CPC .............. *B60R 22/48* (2013.01); *B60R 22/18* (2013.01); *H01H 1/44* (2013.01); *B60R 2022/1812* (2013.01); *B60R 2022/4833* (2013.01)

(58) Field of Classification Search
CPC ............ B60R 22/18; B60R 2202/1806; B60R 2202/1812; B60R 22/48;
(Continued)

(56) References Cited

U.S. PATENT DOCUMENTS

| | | | |
|---|---|---|---|
| 4,991,873 A * | 2/1991 | Matsui | .................... B60R 22/06 16/95 R |
| 6,931,696 B2 * | 8/2005 | Lee | ......................... B60R 22/48 24/633 |

(Continued)

FOREIGN PATENT DOCUMENTS

| | | |
|---|---|---|
| JP | 2003-189912 A | 7/2003 |
| JP | 2008-041583 A | 2/2008 |
| JP | 2015-198855 A | 11/2015 |

OTHER PUBLICATIONS

International Search Report for International Application No. PCT/JP2017/028311, dated Sep. 12, 2017, 1 pg.

*Primary Examiner* — Van T Trieu
(74) *Attorney, Agent, or Firm* — Dickinson Wright PLLC

(57) ABSTRACT

A seatbelt buckle device includes a buckle switch (40) having a switch substrate (42) and a slider part (50) which slides on the switch substrate (42) and a frame (20) which has a substantially U-shaped section and slidably holds an ejector (30) which operates synchronously with attachment/detachment of a tongue plate (1). The buckle switch (40) and the frame (20) are assembled integrally with each other as the a leg part (43) as a rear end of the switch substrate (42)

(Continued)

is fixed to a side wall (22A) of the frame (20) through a switch substrate housing (45) and thus supported by the frame (20).

11 Claims, 7 Drawing Sheets

(58) Field of Classification Search
CPC .... B60R 2202/4808; B60R 2202/4816; B60R 2202/4833; B60R 2202/485; B60R 2202/4883; H01H 1/12; H01H 1/36; H01H 1/44; H01H 1/46
See application file for complete search history.

(56) References Cited

U.S. PATENT DOCUMENTS

| | | | |
|---|---|---|---|
| 8,327,512 B2 * | 12/2012 | Yamanaka | B60R 22/48 200/547 |
| 8,869,357 B2 * | 10/2014 | Midorikawa | A44B 11/2523 24/633 |
| 8,978,214 B2 * | 3/2015 | Kataoka | A44B 11/2523 24/637 |
| 2008/0035465 A1 | 2/2008 | Muromachi | |

* cited by examiner (a)

(b)

(a)

(b)

SEATBELT BUCKLE DEVICE AND SEATBELT DEVICE

CROSS-REFERENCE TO RELATED APPLICATIONS

This application is a 35 U.S.C. § 371 national phase of PCT International Application No. PCT/JP2017/028311, filed Aug. 3, 2017, which claims the benefit of priority under 35 U.S.C. § 119 to Japanese Patent Application No. 2016-154638, filed Aug. 5, 2016, the contents of which are incorporated herein by reference in their entirety.

FIELD OF THE INVENTION

The present invention relates to a seatbelt buckle device and a seatbelt device, and more particularly to a seatbelt buckle device including a buckle switch which detects whether the tongue of a seatbelt for an automobile or the like is in a locked state or an unlocked state, and to a seatbelt device.

BACKGROUND

In recent years, a seatbelt buckle device includes therein a buckle switch which detects whether an occupant is buckled up, so that airbag deployment output, a seatbelt winding motor, and the like are controlled depending on whether the seatbelt is buckled. An example of a known buckle switch of this kind is provided with a fixed contact and a movable contact in the buckle and configured to allow the movable contact to slide into contact with the fixed contact as a tongue plate is inserted, so that whether the seatbelt is buckled/unbuckled is detected on the basis of a change in the contact. Such a device is described by Japanese Patent Application Publication No. 2009-240528.

For example, the conventional buckle switch 100 shown in FIG. 7 of the present disclosure includes a switch substrate 101 having a fixed contact 102 provided on one surface thereof (on the side of a frame 112) and a slider part 105 which has a movable contact (not shown) and moves by sliding on the switch substrate 101. The switch substrate 101 is positioned with its longitudinal ends being fitted in the grooves 111 of the lower case 110 and is arranged along one side wall 113 of the frame 112. A connecting part 106 which protrudes from the slider part 105 to the side wall 113 is engaged with the forked groove 116 of an ejector 115. The ejector 115 operates synchronously with detachment/attachment of the tongue plate (not shown) to be guided to the insertion hole 114 of the frame 112 and slide therein. The insertion of the tongue plate causes the ejector 115 to slide, so that the slider part 105 slides on the fixed contact 102 of the switch substrate 101 together with the movable contact, and the contact state is switched.

However, in the conventional buckle switch 100 shown in FIG. 7, the frame 112 having a plurality of buckle activating parts activated by the insertion of the tongue plate and the switch substrate 101 are fixed independently from each other in the lower case 110, so that during assembling of the buckle switch 100, the relative positions among the elements can vary, i.e., the frame 112, the switch substrate 101, and the lower case 110 should be adjusted to fall within tolerance ranges, which increases the man-hours for assembling. Since the frame 112 and the switch substrate 101 are provided independently from each other, the seatbelt buckle device may be relatively large. The switch substrate 101 is fitted and fixed in the grooves 111 of the lower case 110, so that wear debris generated by the sliding movement of the buckle activating parts, and sand and dust in the buckle may stick to the switch substrate 101, which may lower the contact resistance at the switch contact part (the contact point between the fixed contact 102 and the movable contact), and there has been a demand for a measure against the problem.

Since the fixed contact 102 is provided on the side of the frame 112 of the switch substrate 101, wear debris generated as the buckle activating parts slide easily sticks directly to the fixed contact 102, and the switch contact may catch foreign matter, which is more likely to cause a drop in the contact resistance.

SUMMARY

With the foregoing in view, it is an object of the present invention to provide a more compact seatbelt buckle device and to provide a seatbelt buckle device which allows a buckle switch to be assembled more easily and have improved reliability, and a seatbelt device including the seatbelt buckle device.

An object of the invention is achieved by the following features.

A seatbelt buckle device according to an embodiment of the present invention includes a buckle switch which having a switch substrate and a slider part which slides on the switch substrate, the buckle switch detecting whether a tongue is inserted in and connected with a buckle as the slider part moves by sliding on the switch substrate synchronously with attachment/detachment of the tongue and a frame which has a substantially U-shaped section and slidably holds an ejector, the ejector sliding synchronously with attachment/detachment of the tongue, the switch substrate being supported by the frame as one end thereof is fixed to a side wall of the frame.

The seatbelt buckle device of an embodiment of the present invention may also include a feature wherein the slider part includes a pin to be fitted to a hole part formed in the ejector, and the pin is offset to one end side of the switch substrate from a middle part of the slider part in a sliding direction.

The seatbelt buckle device of an embodiment of the present invention may also include a feature further including a case cover for storing the buckle switch and the frame, wherein the other end of the switch substrate is held by the case cover.

The seatbelt buckle device of an embodiment of the present invention may also include a feature wherein the buckle switch includes a substrate housing attached to one end of the switch substrate and held at the side wall of the frame, and one end of the switch substrate is fixed to the side wall of the frame through the substrate housing.

The seatbelt buckle device of an embodiment of the present invention may also include a feature wherein the buckle switch includes a substrate housing attached to one end of the switch substrate and held at the side wall of the frame, one end of the switch substrate is fixed to the side wall of the frame through the substrate housing, the other end of the switch substrate has a first flat surface in contact with the case cover, and one end of the switch substrate has a second flat surface in contact with the substrate housing and facing in the same direction as the first flat surface.

The seatbelt buckle device of an embodiment of the present invention may also include a feature wherein the substrate housing is provided with a raised part or a recessed part in the moving direction of the slider part, and the switch substrate is provided with a recessed part in abutment against the raised part of the substrate housing or a raised part in abutment against the recessed part of the substrate housing.

The seatbelt buckle device of an embodiment of the present invention may also include a feature further including a case cover for storing the buckle switch and the frame, wherein one end of the switch substrate is supported by the frame in a cantilever manner and the other end of the switch substrate is stored in a substrate storing part of the case cover in a non-contact state.

The seatbelt buckle device of an embodiment of the present invention may also include a feature wherein the buckle switch includes a substrate housing attached to one end of the switch substrate and held at the side wall of the frame, and one end of the switch substrate is fixed to the side wall of the frame through the substrate housing.

The seatbelt buckle device of an embodiment of the present invention may also include a feature wherein the switch substrate is provided with a fixed contact, the slider part is provided with a movable contact, and the movable contact is switched between a contact state and a non-contact state with respect to the fixed contact as the slider part moves by sliding on the switch substrate synchronously with attachment/detachment of the tongue.

The seatbelt buckle device of an embodiment of the present invention may also include a feature wherein the fixed contact is provided on a surface of the switch substrate on the opposite side to a surface of the switch substrate opposed to the side wall of the frame.

In the seatbelt buckle device according to the present invention, since one end of the switch substrate is fixed to a side wall of the frame and thus supported by the frame, and the switch substrate and the frame are assembled integrally with each other, the seatbelt buckle device may be reduced in size, and when the buckle switch and the frame are incorporated into the case cover, positional adjustment between the switch substrate and the frame is not necessary, so that the assembling may be easier. In particular, according to the present invention, the switch substrate can be held when the switch substrate cannot be held by a groove provided on a surface of a case cover having a frame provided thereon as with the conventional device because of the reduction in the size of the buckle device.

DETAILED DESCRIPTION

Figure 1:
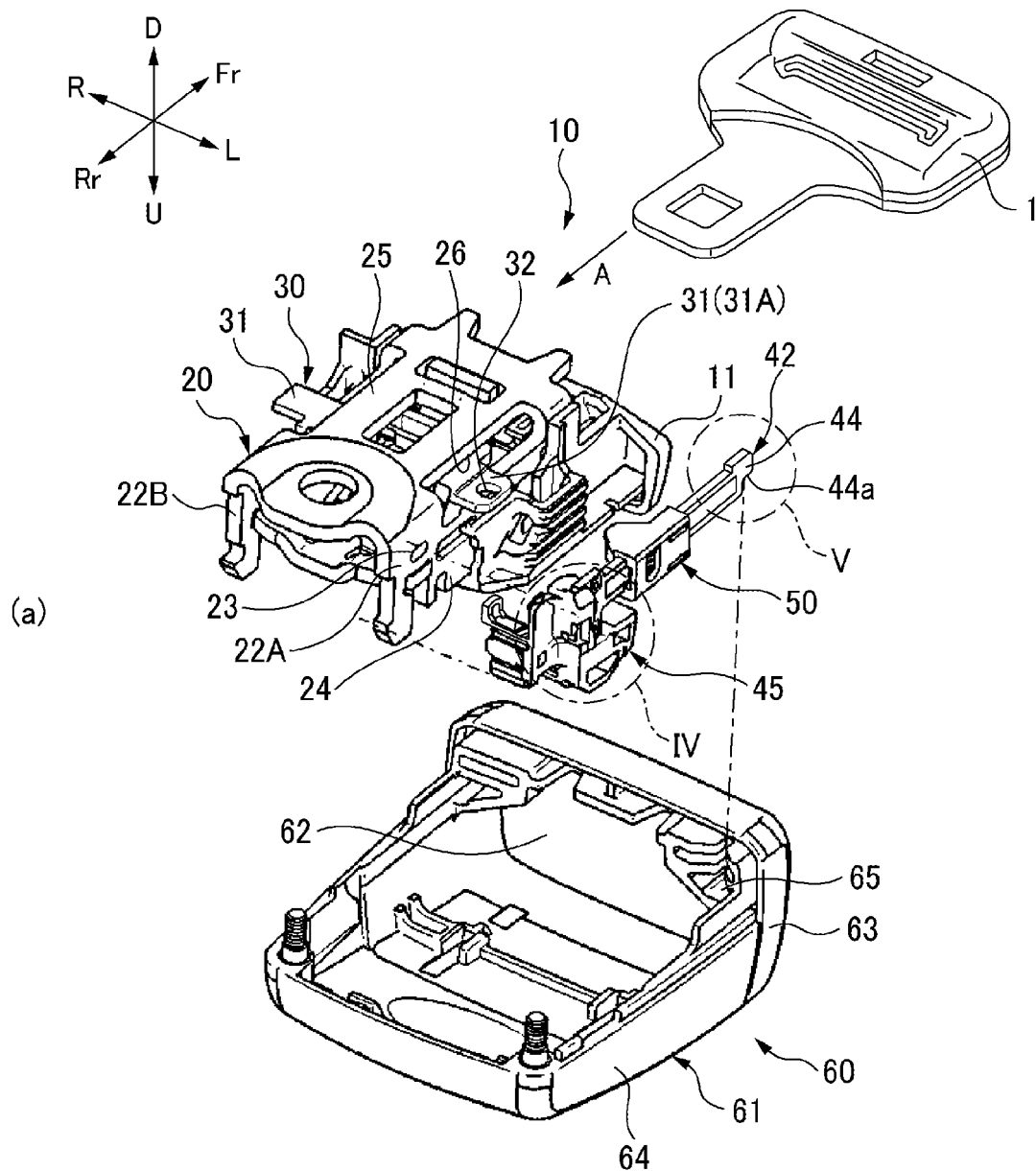
FIG. 1(a) is an exploded perspective view of a seatbelt buckle device according to the present invention.
FIG. 1(b) is a perspective view of a slider part having a movable contact.

A seatbelt buckle device according to one embodiment of the present invention will be described in detail with reference to the accompanying drawings. Note that the following description will be provided in conjunction with various directions in FIG. 1, i.e., the front (Fr), the rear (Rr), the left (L), the right (R), the upward (U), and the downward (D). The arrow A from the front to the back refers to the direction in which the tongue plate 1 is inserted.

As shown in FIG. 1(a), a seatbelt buckle device 10 includes a frame 20 which is assembled with buckle activating parts such as a release button 11 which disconnects the tongue plate 1 and an ejector 30 activated synchronously with detachment/attachment of the tongue plate 1 and a buckle switch 40 provided along a side of the frame 20 to electrically detect whether the tongue plate 1 is connected to the buckle device 10. The frame 20 and the buckle switch 40 are stored in a case cover 60. An upper shell (not shown) mates with case cover 60 to fully enclose frame 20.

The frame 20 is formed using a steel plate bent to have a substantially U-shaped section, and has a pair of side walls 22A and 22B provided to extend perpendicularly to a bottom plate 25 in the left-right direction. The side wall 22A of the frame 20 is provided with a hole 23 and an engagement part 24 for attaching the buckle switch 40. An insertion hole 26 is provided in the insertion direction of the tongue plate 1 along the bottom plate 25 at the upper parts of the side walls 22A and 22B of the frame 20.

The left and right arm parts 31 of the plate-shaped ejector 30 are provided to protrude at the insertion hole 26. The ejector 30 is provided in the frame 20 so that the ejector is pressed by the tongue plate 1 inserted in the seatbelt buckle device 10 to allow the left and right arm parts 31 and 31A to move in the front-back direction in the insertion hole 26.

The arm part 31A of the ejector 30 which protrudes from the insertion hole 26 in the direction in which the buckle switch 40 is provided has an engagement hole 32 which is engaged with the pin 54 of the slider part 50 which will be described.

Figure 2:
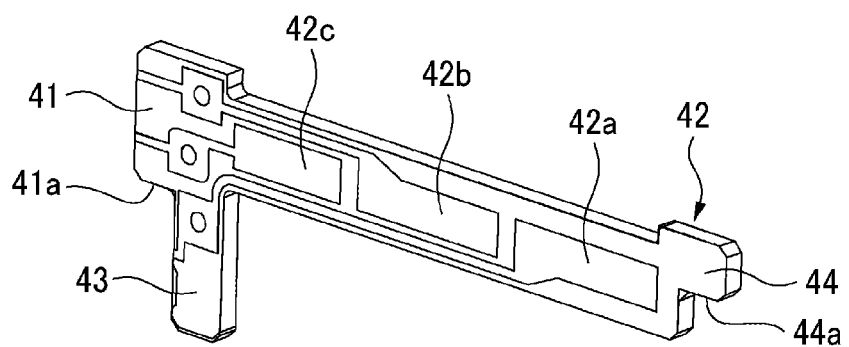
FIG. 2 is a perspective view of a switch substrate.
Figure 3:
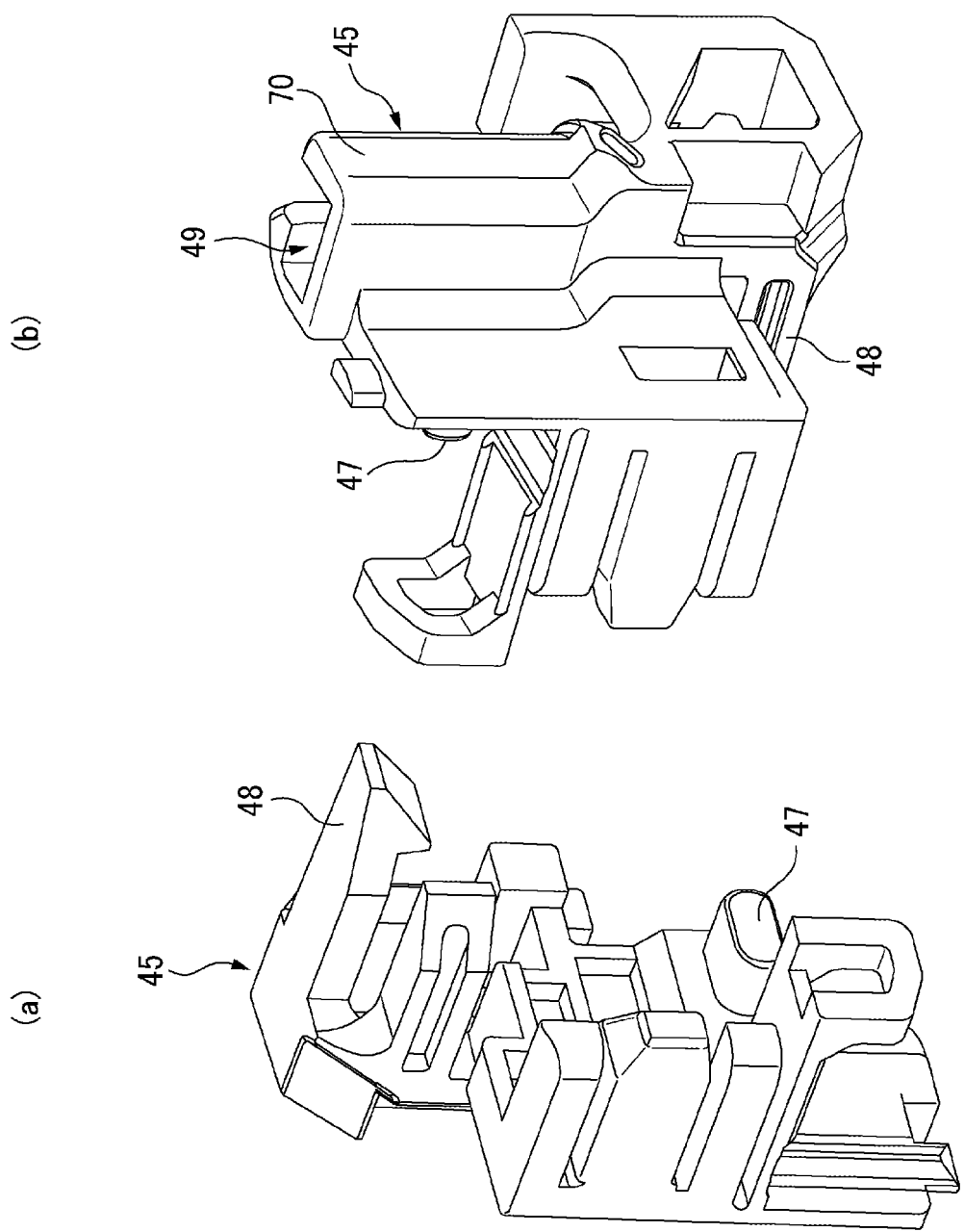
FIG. 3(a) is a perspective view of a substrate housing.
FIG. 3(b) is a perspective view of the substrate housing in FIG. 3(a) as viewed from below.

With reference to FIGS. 2 and 3(a) and (b), the buckle switch 40 includes a switch substrate 42 formed to have a substantially L shape, a resin substrate housing 45 which fixes one end of the switch substrate 42 to the frame 20 and from which lead wires 71 (see FIG. 4(a)) connected to the terminals of fixed contacts 42a, 42b, and 42c (which will be described later) are drawn, and the slider part 50 which slides on the switch substrate 42 synchronously with the tongue plate 1.

The three fixed contacts 42a, 42b, and 42c are formed insulated from one another at one surface of the switch substrate 42 in the longitudinal direction. The switch substrate 42 has a leg part 43 provided to protrude downward at a rear end thereof and a rear raised part 41 provided to protrude rearward beyond the leg part 43 in the moving direction of the slider part 50. The switch substrate 42 is fixed to the substrate housing 45 as the leg part 43 is inserted in a longitudinal groove 46 formed in the substrate housing 45 and the raised part 41 is inserted in a recessed part 49 formed in the substrate housing 45 and recessed in the moving direction of the slider part 50. The switch substrate 42 is fixed to the substrate housing 45 so that the three fixed contacts 42a, 42b, and 42c face the opposite side to the side wall 22A of the frame 20 when the buckle switch 40 is attached to the frame 20.

The switch substrate 42 is fixed to the side wall 22A of the frame 20 through the substrate housing 45 as a protruding part 47 which protrudes from the substrate housing 45 is fitted to the hole 23 of the frame 20 and an engagement claw 48 provided to extend from the substrate housing 45 is engaged with the engagement part 24 of the frame 20.

The switch substrate 42 fixed to the side wall 22A of the frame does not have its front end 44 bound, and is supported in a cantilever manner as its rear end having the leg part 43 and the raised part 41 are fixed to the side wall 22A of the frame 20 through the substrate housing 45. More specifically, the switch substrate 42 elastically deforms in the plate thickness-wise direction (laterally), so that the front end 44 can be displaced in the direction toward or apart from the side wall 22A.

More specifically, the front end 44 of the switch substrate 42 has a lower surface 44a as a first flat surface, and the rear end of the switch substrate 42 has a lower surface 41a of the raised part 41 as a second flat surface facing in the same direction as the lower surface 44a of the front end 44.

Figure 4:
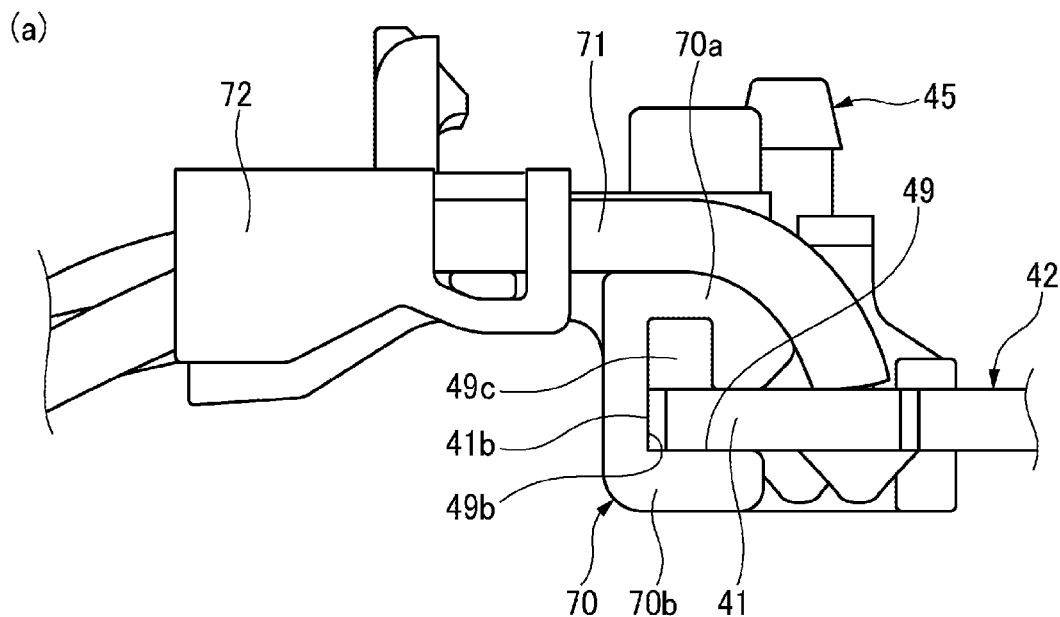
FIG. 4(a) is an essential part enlarged view of the components in the area marked as IV in FIG. 1(a) as viewed from above.
FIG. 4(b) is an essential part sectional view illustrating a rear end of the switch substrate corresponding to the area components in FIG. 1(a) fixed to the substrate housing.
Figure 4:
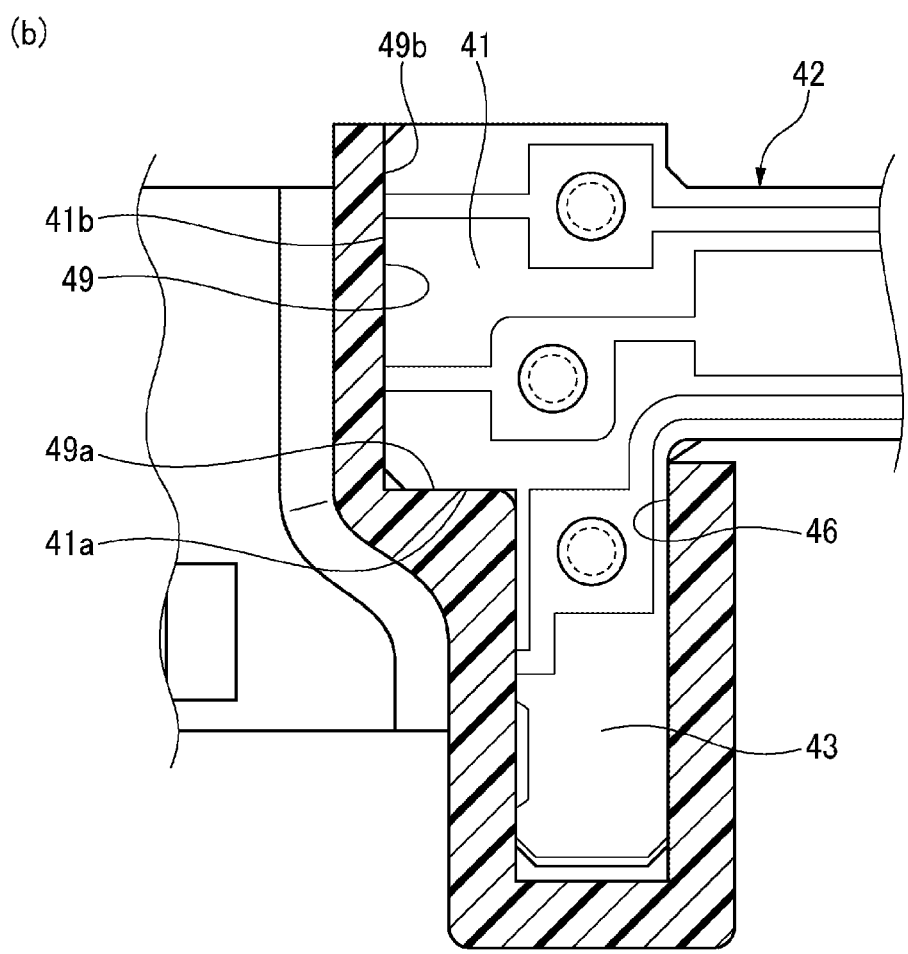

As shown in FIG. 4(b), the lower surface 41a of the raised part 41 abuts against the bottom surface 49a of the recessed part 49 of the substrate housing 45, so that the switch substrate 42 may be restricted from moving in the up-down direction. The rear end surface 41b of the raised part 41 abuts against the side wall 49b of the recessed part 49, so that the switch substrate 42 may be restricted from moving in the front-back direction (the moving direction of the slider part 50).

As shown in FIG. 4(a), in the side wall part 70 which forms the recessed part 49, a part 70a on the frame side with respect to the switch substrate 42 is formed spread toward the frame 20 and the front side with respect to the part 70b on the opposite side to the frame side so that the side wall part can guide the lead wires 71. The outer surface of the part 70a of the side wall part 70 on the frame side is curved in a raised shape in a top view in order to guide the lead wires 71 in the rearward direction.

The recessed part 49 has a lateral hole 49c which forms a space as the switch substrate 42 is inserted, and the recessed part 49 is formed in an L-shape in a top view. In this manner, the presence of the lateral hole 49c in the recessed part 49 allows the side wall part 70 to be reduced in weight and also the side wall part 70 on the side of the frame 20 to easily deform, so that the raised part 41 of the switch substrate 42 may be more easily inserted into the recessed part 49.

Note that in FIG. 4(a), the reference numeral 72 refers to a holder which holds the lead wires 71 in a bundle.

Referring back to FIG. 1, the slider part 50 is a resin member formed to have a substantially U-shaped section and provided with a guide groove 52 at the inner surface of each of a pair of walls 51 which extends horizontally one upon the other. The guide grooves 52 are slidably fitted to the switch substrate 42 and guide the slider part 50 in the longitudinal direction of the switch substrate 42.

The extended part 53 of the slider part 50 provided to extend from the upper wall 51 in the figure has the pin 54 formed to extend downward. In this manner, when the slider part 50 is assembled to the switch substrate 42, the pin 54 is provided on the opposite side to the surface at which the fixed contacts 42a, 42b, and 42c of the switch substrate 42 are provided. The pin 54 is offset to one end side of the switch substrate 42 from the middle part of the slider part 50 in the sliding direction. In this manner, the pin has a smaller length and a smaller size than the pin 54 without such offset.

The movable contact 55 having a plurality of contacts are fixed at the inner surface of the slider part 50 and slides together with the slider part 50, which short-circuits between the fixed contacts 42a and 42b of the switch substrate 42 or between the 42b and 42c, so that the contact state is switched.

The case cover 60 includes an upper case cover 61 as shown and a lower case cover (not shown) assembled with the upper case cover 61. The upper case cover 61 includes a tubular part 63 having an opening 62 in the center into/from which the tongue plate 1 is inserted/withdrawn and a hood part 64 provided continuously with the tubular part 63 and having a substantially U-shaped section. A substrate storing part 65 which stores the front end 44 of the switch substrate 42 in a non-contact floating manner is provided on a front corner of the hood part 64. The lower case cover is attached to cover the hood part 64 of the upper case cover 61.

The buckle switch 40 is fixed to the side wall 22A of the frame 20 as the pin 54 of the slider part 50 is inserted in the engagement hole 32 of the ejector 30, the protruding part 47 of the substrate housing 45 and the hole 23 of the frame 20 are fitted with each other, and the engagement claw 48 of the substrate housing 45 is engaged with the engagement part 24 of the frame 20. The buckle switch 40 assembled integrally with the frame 20 (i.e., as a sub-assembly) is incorporated into the case cover 60 together with the frame 20. At the time, the front end 44 of the switch substrate 42 as a free end is stored without contacting the substrate storing part 65 of the upper case cover 61.

Figure 5:
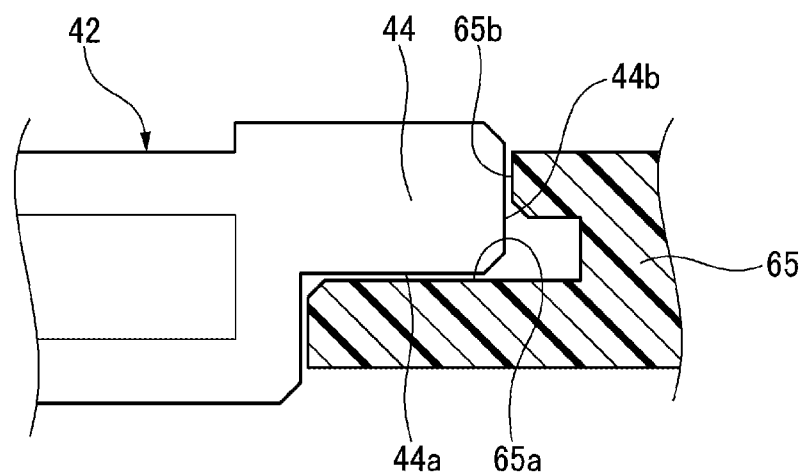
FIG. 5 is an enlarged perspective view illustrating the positional relation between the front end of the switch substrate corresponding to the components in the area marked as V part in FIG. 1(a) and the switch substrate storing part.

More specifically, as shown in FIG. 5, the front end 44 of the switch substrate 42 has its lower surface 44a opposed to the upper surface 65a of the substrate storing part 65 with a slight gap therebetween, and its tip end surface 44b opposed to the side surface 65b of the substrate storing part 65 with a slight gap therebetween. In this manner, no excess load is applied on the front end 44 of the switch substrate 42, and the switch substrate 42 may have sufficient durability.

Note that if the lower surface 44a or the tip end surface 44b abuts against the upper surface 65a or the side surface 65b of the substrate storing part 65 and a large load acts thereupon, the front end 44 of the switch substrate 42 may restrict the switch substrate 42 from being displaced.

In the seatbelt buckle device 10 having the structure, when the tongue plate 1 is inserted in the seatbelt buckle device 10, the ejector 30 is pressed by the tongue plate 1 to move in the insertion hole 26 of the frame 20. In this manner, the slider part 50 having its pin 54 engaged with the engagement hole 32 of the ejector 30 operates synchronously with attachment/detachment of the tongue plate 1 and moves by sliding on the switch substrate 42.

It is then determined whether the movable contact 55 has switched between the fixed contacts 42a and 42b or between the fixed contacts 42b and 42c to a contact or non-contact state, so that the tongue plate 1 is inserted in and connected with the seatbelt buckle device 10.

As in the foregoing, the seatbelt buckle device 10 according to the embodiment includes the switch substrate 42 provided with the fixed contacts 42a, 42b, and 42c, the buckle switch 40 having the slider part 50 provided with the movable contact 55 to slide on the switch substrate 42, and the frame 20 having a U-shaped section which operates synchronously with detachment/attachment of the tongue plate 1 and slidably holds the ejector 30. The buckle switch 40 is supported by the frame 20 as the leg part 43 is fixed to the side wall 22A of the frame 20 through the substrate housing 45, and the buckle switch 40 and the frame 20 are integrally assembled with each other, so that the seatbelt buckle device 10 may be reduced in size. When the buckle switch 40 and the frame 20 are incorporated into the case cover 60, positional adjustment between the switch substrate 42 and the frame 20 is not necessary, and therefore the assembling may be easier.

The leg part 43 of the switch substrate 42 is supported by the frame 20 in a cantilever manner, and the front end 44 of the switch substrate 42 is not bound and may elastically deform in the plate thickness-wise direction in response to the movement of the slider part 50, so that foreign matter such as sticking dust may easily fall, a drop in the contact resistance at the switch contact part caused by foreign matter can be restricted, and the buckle switch 40 may have improved reliability.

The seatbelt buckle device 10 further includes the case cover 60 which stores the buckle switch 40 and the frame 20, the front end 44 of the switch substrate 42 is stored in the substrate storing part 65 of the case cover 60 in a non-contact manner, and therefore the switch substrate 42 may be restricted from elastically deform excessively, so that the switch substrate 42 can be held in a stable manner.

The buckle switch 40 includes the substrate housing 45 attached to the leg part 43 of the switch substrate 42 and held by the side wall 22A of the frame 20, the leg part 43 of the switch substrate 42 is fixed to the side wall 22A of the frame 20 through the substrate housing 45, and therefore switch substrate 42 is supported in a cantilever manner.

The fixed contacts 42a, 42b, and 42c are provided on the surface of the switch substrate 42 on the opposite side to the surface opposed to the side wall 22A of the frame 20, so that wear debris generated because of the sliding movement of the buckle activating parts hardly sticks to the fixed contacts 42a, 42b, and 42c, a drop in the contact resistance caused by foreign matter caught at the switch contact part can be prevented, and the buckle switch 40 may have improved reliability.

Furthermore, the slider part 50 includes the pin 54 fitted to the engagement hole 32 formed in the ejector 30, and the pin 54 is offset to one end side of the switch substrate 42 from the middle part of the slider part 50 in the sliding direction, so that the pin 54 has a smaller length than the pin without such offset and the seatbelt buckle device 10 can be reduced in size.

Note that the invention is not limited by the described embodiment and may be modified and improved as appropriate.

The method for fixing one end of the switch substrate and the side wall of the frame, particularly the method for fixing the substrate housing and the side wall of the frame is not limited to the method according to the embodiment.

Figure 6:
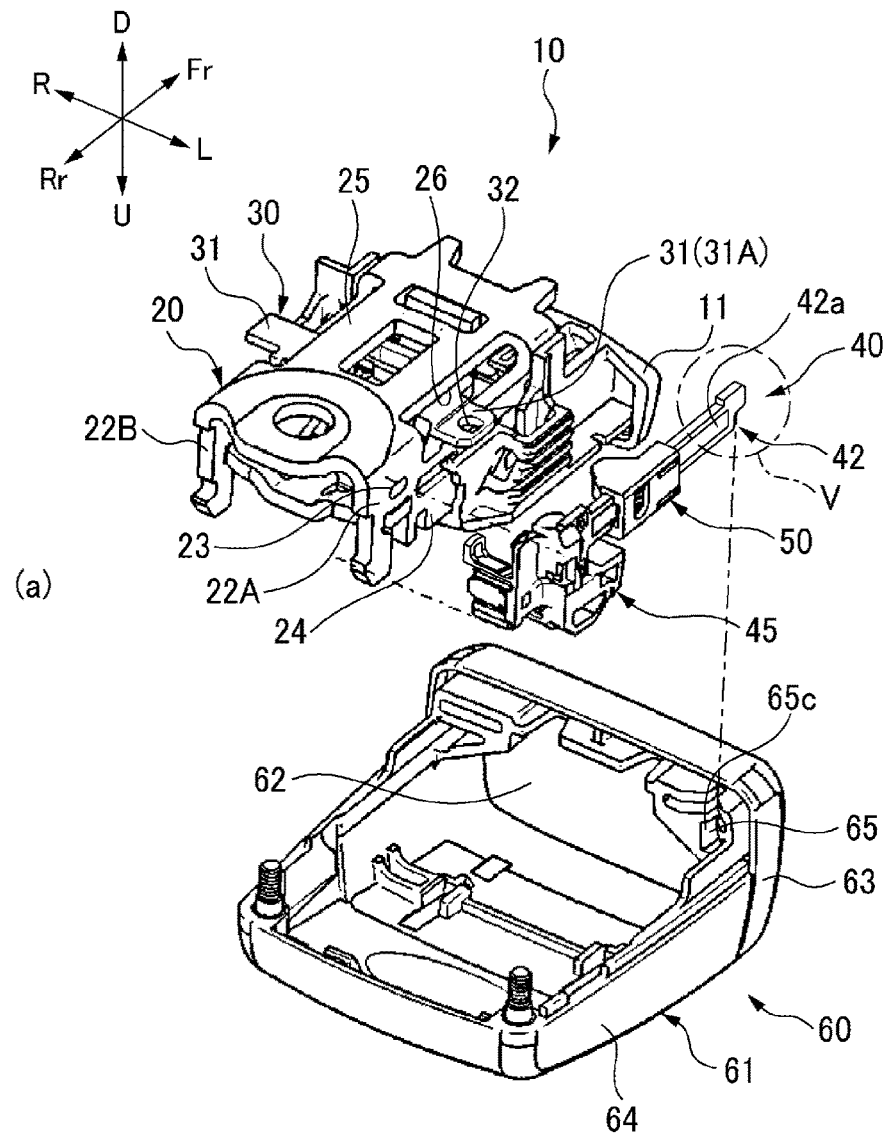
FIG. 6(a) is an exploded perspective view of a seatbelt buckle device according to a modification.
FIG. 6(b) is an enlarged view illustrating the positional relation between the front end of the switch substrate corresponding to the area V in FIG. 6(a) and the switch substrate storing part.
Figure 6:
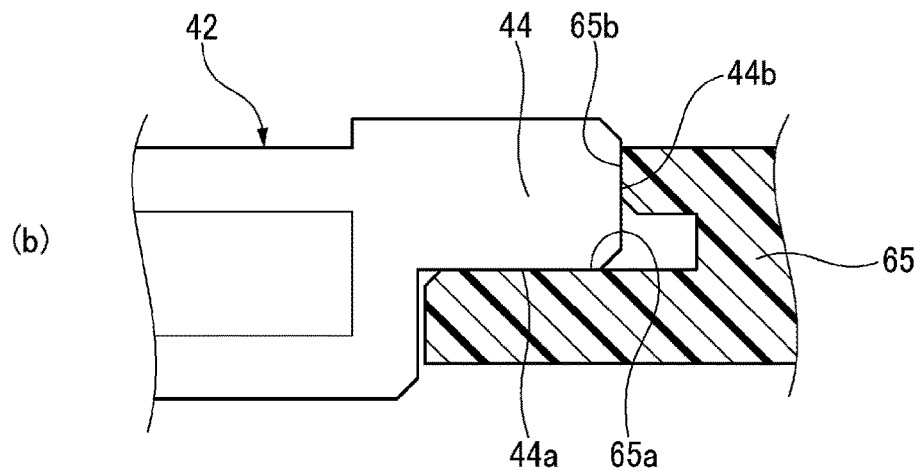
Figure 7:
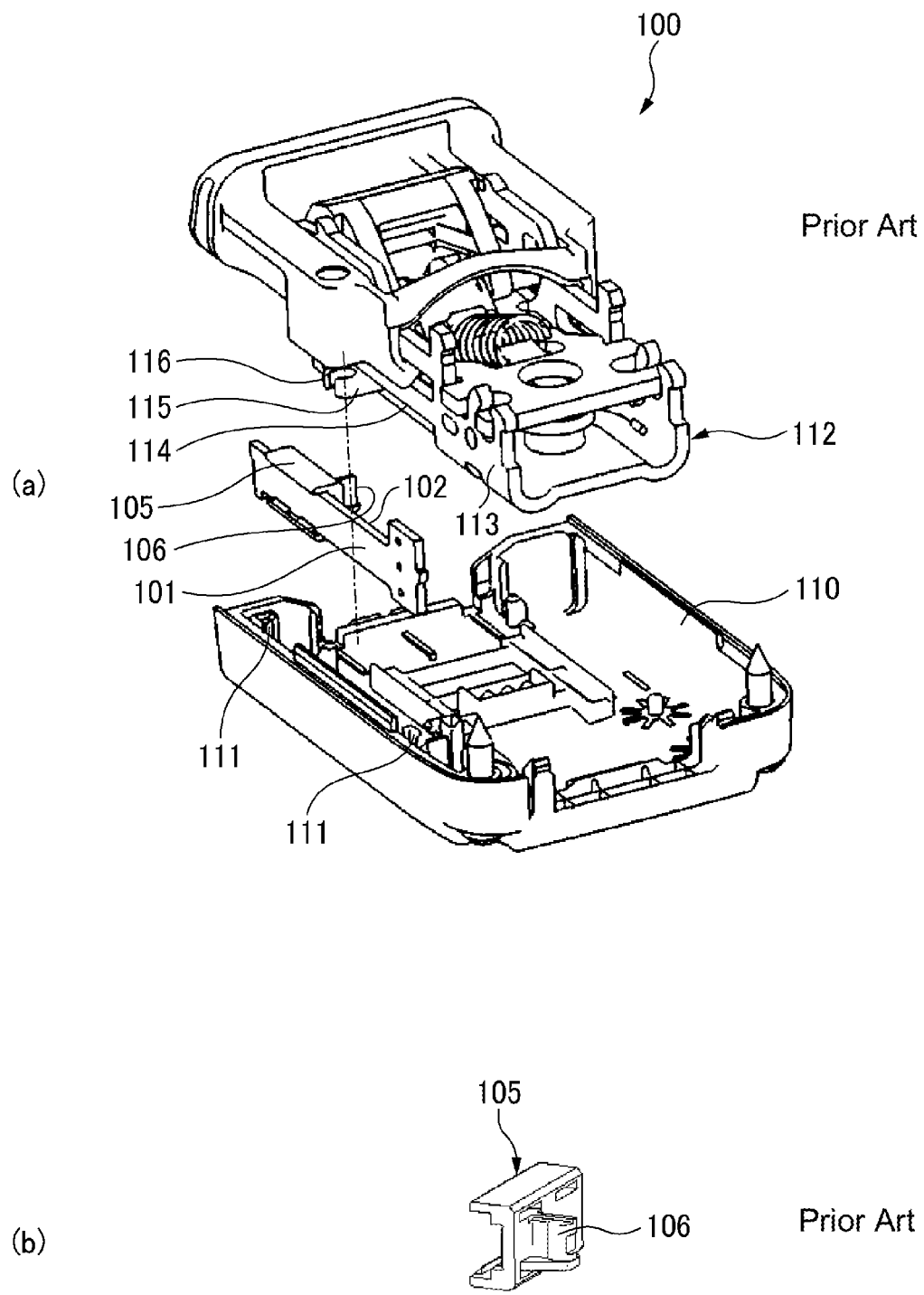
FIG. 7(a) is an exploded perspective view of a conventional seatbelt buckle device.
FIG. 7(b) is a perspective view of a slider part, both illustrating a device in accordance with the prior art.

For example, according to the embodiment, the front end 44 of the switch substrate 42 is stored in the substrate storing part 65 of the case cover 60 in a non-contact manner, while the front end 44 of the switch substrate 42 may be held by an upper surface 65a of a substrate holder provided on a front corner of the hood part 64 of the case cover 60 as in the modification shown in FIG. 6(a). In this case, the front end 44 of the switch substrate 42 is held by the substrate storing part 65 of the case cover 60, and the rear end having the leg part 43 and the raised part 41 are held by the frame 20, so that the switch substrate 42 may be held more stably at the ends. Note that the substrate holder 65a of the case cover 60 may be a holding hole or a holding groove.

In this case, as shown in FIG. 6(b), at the front end 44 of the switch substrate 42, the lower surface 44a abuts against the upper surface 65a of the substrate holder 65, and the tip end surface 44b abuts against the side surface 65b of the substrate holder 65. Similarly to the embodiment, referring to FIG. 4(b), the lower surface 41a of the raised part 41 of the switch substrate 42 abuts against the bottom surface 49a of the recessed part 49 of the substrate housing 45, and the rear end surface 41b of the raised part 41 abuts against the side wall 49b of the recessed part 49. In this manner, according to the modification, the switch substrate 42 may be restricted from moving in the up-down and the front-back directions at the ends of the switch substrate 42.

Since the side surface of the front end 44 in the plate thickness-wise direction abuts against the opposed surface 65c of the substrate holder 65, the movement of the switch substrate 42 in the plate thickness-wise direction may be restricted.

According to the embodiment, the raised part 41 is provided at the switch substrate 42 and the recessed part 49 is provided at the substrate housing 45 in order to restrict the movement of the switch substrate 42 in the front-back direction, while, alternatively, a recessed part recessed in the moving direction of the slider part 50 may be provided at the switch substrate 42 and a raised part to abut against the recessed part may be provided at the substrate housing 45 according to the present invention.

Also according to the embodiment, the fixed contacts are provided at the switch substrate and the movable contact is provided at the slider part, while the buckle switch according to the present invention is not limited by the embodiment. More specifically, in the buckle switch, one of the switch substrate and the slider part may be printed with a coil or provided with an embedded magnet in order to generate a magnetic field, and a change in the magnetic field may be detected and read using a detecting element such as a Hall effect element provided at the other of the switch substrate and the slider part, so that whether the tongue is inserted in and connected with the buckle may be detected.

While the above description constitutes the preferred embodiment of the present invention, it will be appreciated that the invention is susceptible to modification, variation and change without departing from the proper scope and fair meaning of the accompanying claims.

The invention claimed is:

1. A seatbelt buckle device having a buckle switch for detecting whether a tongue is inserted into and connected with the buckle device comprising:

the buckle switch includes a switch substrate and a slider part which slides on the switch substrate, the buckle switch detecting whether the tongue is inserted in and connected with the buckle device as the slider part moves by sliding on the switch substrate synchronously with attachment or detachment of the tongue;

a frame which has a substantially U-shaped section forming a pair of side walls and slidably holds an ejector, the ejector sliding synchronously with attachment or detachment of the tongue, the ejector including an arm part extending laterally from the ejector and through an insertion opening of the frame and forming an engagement hole, and the buckle switch includes a substrate housing attached to a first end of the switch substrate and mounted to the side wall of the frame, and the first end of the switch substrate is fixed to the side wall of the frame through the substrate housing, the slider part forming an engagement pin which is positioned in the engagement hole connecting the slider with the ejector.

2. The seatbelt buckle device of claim 1 further comprising, the pin is offset to a first end side of the switch substrate from a middle part of the slider part in a sliding direction.

3. The seatbelt buckle device of claim 1 further comprising, a case cover for enclosing the buckle switch and the frame, wherein a second end of the switch substrate is enclosed by the case cover.

4. The seatbelt buckle device of claim 3 further comprising,
the second end of the switch substrate has a first flat surface enclosed by a substrate storing part of the case cover, and
the first end of the switch substrate has a second flat surface in contact with the substrate housing and facing in the same direction as the first flat surface.

5. The seatbelt buckle device of claim 1 further comprising, the substrate housing is provided with a raised part or a recessed part in the moving direction of the slider part, and the switch substrate is provided with a recessed part in abutment against the raised part of the substrate housing or a raised part in abutment against the recessed part of the substrate housing.

6. The seatbelt buckle device of claim 1 further comprising, a case cover for storing the buckle switch and the frame, wherein the first end of the switch substrate is supported by the frame in a cantilever manner, and a second end of the switch substrate is stored in a substrate storing part of the case cover in a non-contact state.

7. The seatbelt buckle device of claim 1, further comprising, the switch substrate is provided with a fixed contact, the slider part is provided with a movable contact, and the movable contact is switched between a contact state and a non-contact state with respect to the fixed contact as the slider part moves by sliding on the switch substrate synchronously with attachment or detachment of the tongue.

8. The seatbelt buckle device of claim 7 further comprising, the fixed contact is provided on a first surface of the switch substrate on the opposite side to a second surface of the switch substrate opposed to the side wall of the frame.

9. A seatbelt buckle device of claim 1 further comprising, the switch substrate in an elongated form extending between the first end and an opposite second end, the switch substrate oriented parallel to an insertion direction of the tongue and laterally outside of the frame side wall.

10. A seatbelt buckle device of claim 1 further comprising, the substrate housing encloses electrical conductors attached to the switch substrate.

11. A seatbelt device comprising the seatbelt buckle device of claim 1.

* * * * *